United States Patent [19]

Copp

[11] Patent Number: 4,886,146
[45] Date of Patent: Dec. 12, 1989

[54] BLIND CABLE ASSEMBLY

[75] Inventor: Douglas M. Copp, West Milton, Ohio

[73] Assignee: General Motors Corporation, Detroit, Mich.

[21] Appl. No.: 286,114

[22] Filed: Dec. 19, 1988

[51] Int. Cl.$^4$ .............................................. F16D 51/00
[52] U.S. Cl. ................................ 188/2 D; 188/106 A; 188/325
[58] Field of Search .................. 188/2 D, 78, 79, 325, 188/328, 331, 106 R, 106 A, 106 F, 106 P; 74/501.5 R, 502.4, 502.5, 502.6; 267/179, 180

[56] References Cited

U.S. PATENT DOCUMENTS

| | | | |
|---|---|---|---|
| 4,595,084 | 6/1986 | Le Deit | 188/328 |
| 4,753,325 | 6/1988 | Jaksic | 188/328 X |

*Primary Examiner*—Robert J. Oberleitner
*Assistant Examiner*—Matthew C. Graham
*Attorney, Agent, or Firm*—Ernest E. Helms; D. D. McGraw

[57] ABSTRACT

A drum brake assembly having a parking brake actuating lever is provided so that the parking brake cable end may be assembled in a blind fashion to the actuating lever. The cable is provided with a button. A spring is attached to the lever and to the backing plate about a parking brake cable opening. The spring end attached to the lever has a ramp section and a hook end, the ramp section being in a tapered open channel formed on the lever end and the hook end being secured to the lever. The cable button is inserted axially through the backing plate opening through the spring, being guided by the spring, into the channel. Further insertive movement of the cable button causes the button to be deflected upwardly by the coil spring ramp portion and the channel sides, side loading the cable. When the button passes the end of the ramp portion and the channel smaller end, the stored force in the cable because of the side loading moves the cable and the button downwardly in the channel. The button moves into tension a force-transmitting engagement with the edges of the channel smaller end so that as the cable is then tensioned the lever will be moved to actuate the brake.

3 Claims, 1 Drawing Sheet

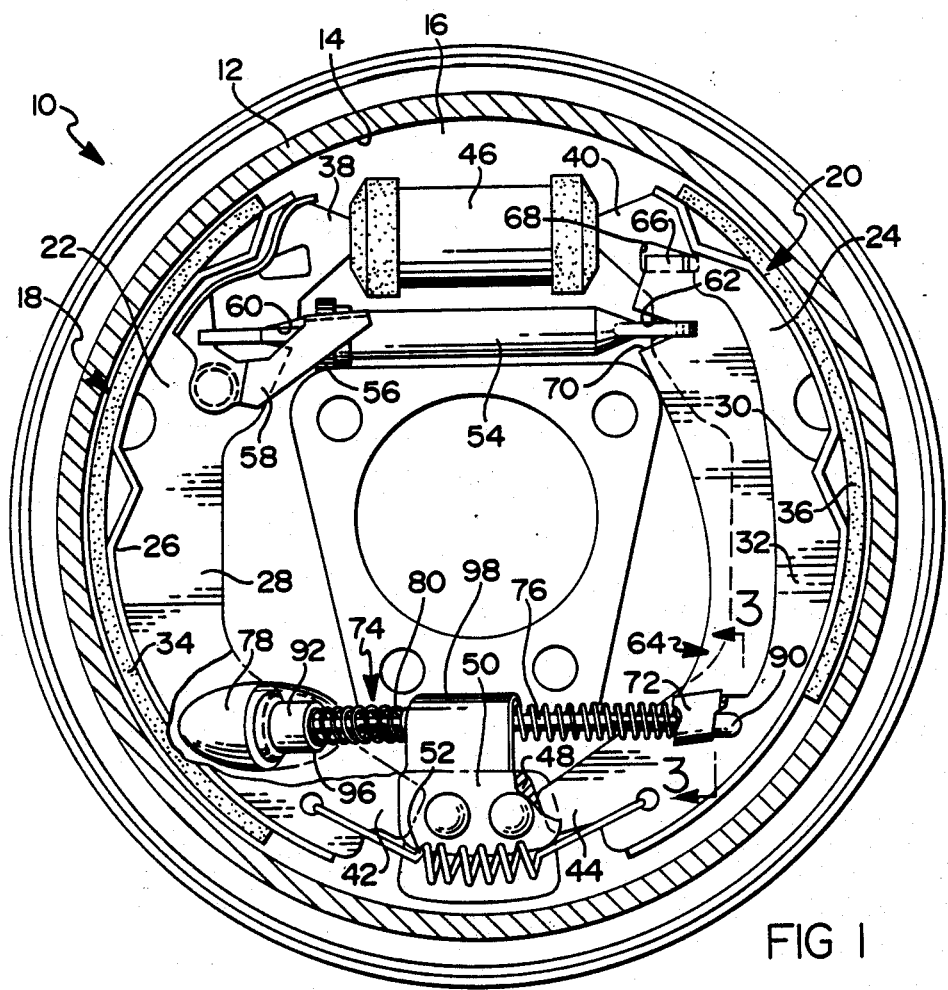
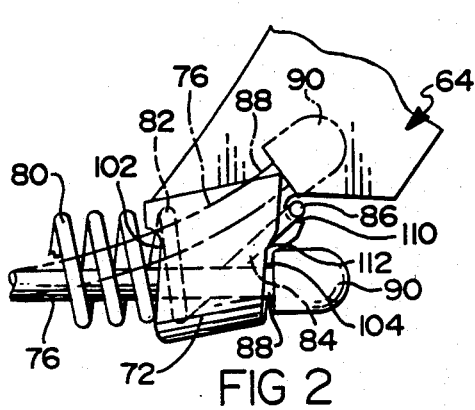
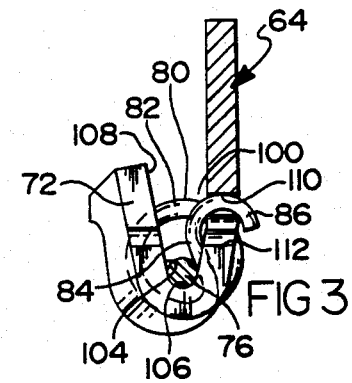

BLIND CABLE ASSEMBLY

CROSS-REFERENCE TO RELATED APPLICATIONS

The arrangement embodying the invention is related to the broad concept disclosure of U.S. patent application Ser. No. 117,120, filed on Nov. 4, 1987, entitled "Blind Assembly of Parking Brake Cable to Parking Brake Lever," and assigned to the common assignee. That disclosure specifically employed a slotted funnel guide and retention member formed on the parking brake lever, and disclosed several types of guide members.

The invention is also related to U.S. patent applications Ser. No. 288,112, entitled "Blind Assembly of Parking Brake Cable to Parking Brake Lever"; and Ser. No. 286,109, entitled "Blind Cable Assembly"; both filed on even date herewith. It is a modification of the invention claimed in Ser. No. 286,109.

BACKGROUND OF THE INVENTION

Typical drum brake parking brake actuating mechanisms used on automobiles for many years (and still being used) have required that the parking brake cable be inserted through the backing plate opening and positioned in approximate relation to the connection point with the parking brake actuating lever, which is pivotally mounted on one of the brake shoe assemblies. The assembly operator then has to maneuver the end of the parking brake cable and/or the parking brake actuating lever to make the connection. This therefore requires that such an assembly be done with the drum brake's being off of the remainder of the brake assembly so that visual and manipulative capabilities are present to complete the assembly. A typical example of such a connection requiring this type of assembly is disclosed in U.S. Pat. No. 3,064,767 entitled "Brake Actuator," and issued Nov. 20, 1962.

FIELD OF THE INVENTION

The invention relates to a drum brake having an internal parking brake lever with the parking brake cable entry being through the backing plate. It more particularly relates to such a drum brake in which the connection of the parking brake cable to the parking brake lever within the drum brake assembly is made in a blind manner; that is, with the person assembling the cable to the lever being able to do so with the drum brake completely assembled on the vehicle.

The arrangement embodying the invention permits the parking brake cable assembly to be inserted through the appropriate opening in the backing plate and to be guided and connected to an end of the parking brake actuating lever which is pivotally mounted on one of the brake shoe assemblies, without the assembly operator's having to see the parts as they are approached and then having to manipulate the parts so as to make the connection. In this arrangement, the cable assembly is inserted through an apertured boss in the backing plate and pushed axially inward into the drum brake assembly. Since the drum is already in position as a part of the drum brake assembly, and therefore covers the brake shoes and closely approaches the backing plate and shield, the assembly is what is known as a blind assembly because the operator cannot see or manipulate each of the components being attached together within the drum brake assembly.

The arrangement is such that, once the mechanism is installed and in position, the assembly operator may pull outwardly on the parking brake cable and check that the cable is properly engaged with and secured to the end of the parking brake actuating lever. Once such engagement is confirmed, the assembly is completed by inserting a conduit assembly into snap-in engagement with a tube guide mounted in the backing plate opening, completing the cable assembly into the brake.

SUMMARY OF THE INVENTION

Assembly of the parking brake actuating cable end to the parking brake lever is accomplished with the brake drum installed by inserting the cable end having a ball or button thereon into the open end of a compression spring which, during assembly, protrudes through the cable entry opening in the backing plate. The spring guides the cable end into a channel formed in the end of the parking brake lever. The spring end connected to the end of the parking brake lever has a hook end located in a notch on the back of the lever with a spring intermediate portion joining the last spring coil with the hook end being positioned in the channel in such a way as to form a ramp. This ramp is engaged by the cable end ball, causing a deflecting force to be exerted on the cable end. The deflection of the cable end causes a downwardly exerted spring force in the cable. As the ball on the cable end passes over the end of the spring hook, the downward spring force causes the ball to drop into position behind the lever, with the cable resting in the bottom of the channel. The cable is then locked into position by a lip formed into the back side of the parking brake lever under which the cable end ball is positioned.

More specifically, a part of the cable guide and parking brake lever return spring provides a ramp in a channel formed on the end of the parking brake actuating lever to receive the button end of the parking brake cable in guiding ramp relation. The ramp and the sides of the channel cammingly guide the button end and the portion of the cable adjacent thereto laterally (upward as seen in the drawing Figures) outward of the channel until the button clears the channel and the ramp, at the same time loading the cable sideways so that it tends to return to the bottom of the channel. Once the button is clear of the channel and the ramp, this sideways load force causes the cable to move back into the bottom of the Channel, and the button is locked under a lip formed on the parking brake actuating lever. The button is moved into its final engaged position by axial movement of the cable and button and the side load of the cable once the cable button is clear of the ramp.

In order to accomplish this, the parking brake cable must be capable of being aimed or prepositioned so that, upon axial assembling movement thereof, it is able to engage the end of the parking brake actuator and then to accomplish the connection. As more fully disclosed in application Ser. No. 117,120 noted above, this may be done in one manner by providing a tube guide, mounted in an opening in the backing plate, which extends from a laterally offset position at the backing plate to a laterally aligned position in spaced relation to the guide and retention means of the actuating lever so that when the parking brake cable is inserted and moved axially, the enlarged cable end section will be guided and connected as above noted. The parking brake actuating lever return spring is provided about the parking brake cable and will also act as a guide for the cable and its enlarged button-like end, particularly throughout the space between the end of the tube guide and the point at which the cable enlarged end or button is received by the guide and retention means. The invention is here illustrated in conjunction with another arrangement in application Ser. No. 117,120. In that arrangement, the tube guide is short, so that it extends through only a small part of the distance between the opening in the backing plate in which it is mounted and the actuating lever guide and retention means. In that instance it is necessary to provide a separate spring guide and support so that the spring is supported properly for blind assembly, as above noted. The spring then acts as a guide member for the cable button as it is moved from the end of the tube guide to the retaining means on the parking brake lever lower end. This is the embodiment disclosed herein to be used in conjunction with the claimed improvement, but other embodiments such as the long curved tube guide which terminates near the end of the parking brake lever, also disclosed in the above noted application Ser. No. 117,120, may be employed.

In either arrangement, it is preferred that the guide and return spring have one end thereof operatively secured to the backing plate for spring reaction. It may be secured in the conduit assembly provided on the parking brake cable assembly in the area where it may be located from the outside of the backing plate to a point within and connected to the tube guide, which is mounted through the backing plate opening. Thus the parking brake cable assembly includes the conduit assembly, the parking brake cable itself, the cable return spring with its ramp and hook end, and a parking brake cable enlarged end such as a ball or button.

The operator will insert the parking brake cable assembly through the tube guide and move the cable and its enlarged end axially through the spring until the blind connection is completed. The operator may then pull back on the parking brake cable to check that the connection is actually completed, feeling an appropriate resistance to such movement. The conduit assembly may then be snapped in position in the tube guide.

It is therefore a feature of the invention herein disclosed and claimed to provide a channel and ramp mechanism which permits a blind assembly of one parking brake cable end to one end of the parking brake actuating lever, the ramp being formed by a part of the cable guide and parking brake lever return spring. This provides a more simple parking brake lever lower end which is easier to manufacture than some other proposed lever lower ends.

BRIEF DESCRIPTION OF THE DRAWING

FIG. 1 is an elevation view of a drum brake assembly embodying the invention, with parts broken away and in section;

FIG. 2 is a fragmentary elevation view of a portion of FIG. 1 showing the preferred embodiment of the invention with portions thereof in elevation. The deflected position of the cable end is illustrated in phantom;

FIG. 3 is an enlarged fragmentary cross-section view of a portion of the assembly of FIG. 1 illustrating further details of the invention.

DESCRIPTION OF THE PREFERRED EMBODIMENT

The drum brake assembly 10 of FIG. 1 includes a rotatable drum 12 having in internal drum friction surface 14. The assembly has a backing plate 16 on which is mounted a first brake shoe assembly 18 and a second brake shoe assembly 20 for movement into and out of engagement with the drum friction surface 14 for brake actuation and release, as is well known in the art.

Shoe assemblies 18 and 20 respectively include shoes 22 and 24 respectively composed of a rim 26 and a web 28, and a rim 30 and a web 32. Shoe assembly 18 has a brake lining 34 secured to the rim 26, and shoe assembly 20 has a brake lining 36 secured to rim 30. The outer surfaces of the linings 34 and 36 provide lining friction surfaces which mate with the drum friction surface 14 during brake actuation. The shoe assemblies 18 and 20 respectively have upper shoe ends 38 and 40 and lower shoe ends 42 and 44. The upper shoe ends are arranged to be operatively engaged by pistons in the wheel cylinder 46 so that the shoe assembly may be hydraulically actuated for service brake operation. As is well known in the art, a suitable service brake operator, such as a master cylinder, provides hydraulic brake fluid under pressure to the wheel cylinder 46 to expand the pistons therein and move the shoe ends 38 and 40 apart so that the linings 34 and 36 are moved into braking engagement with the drum friction surface 14. In the particular brake assembly 10 illustrated, the brake shoe assemblies are arranged in a leading-trailing manner. Therefore, the lower shoe ends 42 and 44 are positioned to engage a fixed anchor 48 at the bottom of the assembly and radially opposite the wheel cylinder 46. The lower shoe ends are guided in position relative to the backing plate by the shoe retainer 50 which is secured to anchor 48. The lower shoe ends 42 and 44 are continuously urged toward the anchor 48 by the spring 52.

The drum brake assembly 10 may also be of other well known types such as the duo servo, leading-leading, and trailing-trailing types. Although not shown, it is to be understood that a suitable brake shoe return spring is connected to the brake shoe rims 26 and 30 in the general area of the wheel cylinder 46 so as to continually urge the upper shoe ends 38 and 40 toward the retracted position. This arrangement is also well known in the art.

The brake assembly is illustrated as having a brake adjuster mechanism, which includes a spreader bar or strut 54, an adjuster wheel 56, and an adjuster lever 58, all well known in the art. The spreader bar or strut 54 is typically provided in two pieces threadedly joined for adjusting purposes. The strut 54 extends into recesses 60 and 62 respectively formed in brake shoe webs 28 and 32 near shoe ends 38 and 40 so as to be retained in proper position relative to the shoes. Since this particular brake assembly is one which also provides for mechanical parking brake actuation, the strut 54 acts as a mechanical spreader bar when the parking brake is applied.

The parking brake assembly, in addition to the use of strut 54 as a spreader bar, has a parking brake actuating lever 64, which has one end 66 pivotally mounted on the web 32. In this example, the web 32 is provided with an aperture 68 through which the lever end 66, bent so as to extend through the aperture 68, extends to provide a pivoting attachment. Other well-known pivoting attachment methods may be used. Lever 64 is also provided with a recess 70, which also receives one end of the spreader bar 54. Lever 64 extends downwardly immediately adjacent to one side of web 32, terminating in a lever lower end 72. As is well known in the art, when lever 64 is pivoted clockwise as seen in FIG. 1, it will act to move the spreader bar 54 against the brake shoe assembly 18, moving that assembly outwardly to engage the drum friction surface 14, with the lever reaction, exerted through the lever end 66 and web 32 at aperture 68, moving the brake shoe assembly 20 so that its lining also engages the drum friction surface 14. Thus, the brake assembly is mechanically actuated for parking brake purposes.

The drum brake assembly 10 is provided with a parking brake cable assembly 74. Assembly 74 is illustrated as including a cable 76 mounted for axial movement in a cable sheath (not shown). The sheath terminates in a cable conduit assembly (also not shown) located on the other side of the backing plate boss 78 while the cable 76 extends therebeyond inside the drum brake assembly, as will be further described. The other ends of cable 76 and its sheath are connected to a parking brake actuating mechanism, such as a pedal assembly, provided for ease of operation by the vehicle operator so that the cable 76 is tensioned when the pedal is actuated to actuate the parking brake mechanism.

The parking brake cable assembly 74 also includes a compression spring 80 which extends about the portion of cable 76 that extends further into the drum brake assembly beyond the conduit assembly guide tube 92. As can be better seen in FIGS. 2 and 3, the spring end coil 82 is positioned for engagement with a portion of the lower end 72 of parking brake actuating lever 64. The end of spring 80 beyond end coil 82 has a ramp section 84 and a hook end 86. The end 88 of cable 76 is provided with an enlarged end section or other element 90, commonly referred to as a button or bullet.

A short tube guide 92 is secured in the boss 78 of the backing plate 16 through which the parking brake assembly is assembled. The tube guide 92 extends so that its terminus 96 is in laterally spaced relation to spring mounting and retaining guide 98. Guide 98 is secured to the backing plate 16 by way of the anchor 48, and may be made as a part of the shoe retainer 50 as shown. Spring 80 is held in place by guide 98, with one spring end extending into the tube guide 92 and terminating therein so that it can transmit spring reaction forces to the backing plate 16. The other spring end formed by ramp section 84 and hook end 86 is attached to the end 72 of the parking brake lever 64. Thus the spring 80 is somewhat curved to provide a smooth guide path for button 90 from the time it is pushed into tube guide 92 until it is locked in position as shown in FIG. 2.

The lower end 72 of lever 64 is formed as an open "J" shape defining a tapered channel 100 by the bottom part of the "J" shape. Channel 100 is tapered axially in a narrowing taper and upwardly in a widening taper. It has an open receiving end 102 facing toward spring mounting and retaining guide 98 and a smaller opening end 104 at its other end. Channel 100 has a small radius bottom inner surface 106 which is about the same diameter as the diameter of cable 76, or only slightly larger. The inner wall 108 of the tapered channel 100 provides button side guide surfaces. A recess or notch 110 is provided in the side of channel 100 formed by the main body of the parking brake lever 64. The hook end 86 of spring 80 is retained in notch 110, as best seen in FIGS. 2 and 3. The ramp portion 84 of spring 80 begins at the bottom of spring coil 82 and extends upwardly at an angle in channel 100 to form a ramp up which the button 90 must ride as the cable 76 is moved axially rightward as seen in FIGS. 1 and 2.

When the parking brake cable end 88 and its button 90 are inserted through the backing plate opening 94 and tube guide 92 by substantially axial movement of the parking brake cable and button, the cable button 90 enters the spring 80 and is guided by it through the spring mounting and cable guide 98 to the parking brake lever lower end 72. Cable 76 and button 90 are forcibly deflected in their path by the button's engagement with the spring ramp portion 84 and the guide surfaces defined by channel inner wall 108. This deflection stores a cantilever spring-like side force in the cable urging the cable downwardly toward the bottom of the channel. Additional axial movement of the cable and its button positions the cable button immediately beyond the smaller opening end 104 of the channel 100 and also immediately beyond the spring hook end 86. This removes the deflective support for the cable, so the cable and its button 90 are moved by the stored force from the phantom position of FIG. 2 to the position shown in solid lines in that Figure. The button is therefore trapped in position, and will not reverse its movements when the cable is tensioned. The end edges of the two sides of the channel may be cut back as shown at 112 to further assure the locking of button 90 in the position shown.

This completes the blind attachment of the cable to the parking brake actuating lever, the cable being in position so that when a tension force is applied thereto the force is transmitted to the parking brake actuating lever and will pivot that lever clockwise, as seen in FIG. 1, to mechanically apply the brake assembly.

When the assembler-operator has made the blind assembly to the extent above described, he exerts a tension force on the cable 76 by pulling on it in the direction away from the backing plate and feeling the resistance to movement of the cable because of the connection to the parking brake actuating lever 64. Having satisfied himself that the connection has been made, he may then insert the conduit assembly from the back side of the backing plate 16 and join it with the tube guide 92 so that the conduit assembly will be retained in the tube guide and sealed therein.

The embodiments of the invention in which an exclusive property or privilege is claimed are defined as follows:

1. In a blind cable assembly, a lever adapted to be pivotally moved to actuate a drum brake mechanism enclosed by a brake drum and a backing plate, said lever having one end formed to an open "J" shape with non-parallel sides forming an axially and upwardly tapered, upwardly open, channel at the bottom of the "J", said channel having an open receiving end and a smaller open other end and a notch in one edge of one of said sides near the upper part of said smaller open end;

a compression coil spring forming a lever return spring and a guide member, said coil spring having one end coil in abutting engagement with said channel sides at said open receiving end and having its other end operatively secured to and grounded for reaction on the backing plate around a backing plate opening so that said coil spring continually urges said lever in a brake released direction, said coil spring having a ramp section extending from said one end coil axially and laterally upward through said channel, and a hook end formed on the other end of said ramp section from said one end coil, said hook end being received in said notch to hold said coil spring securely to said lever one end;

and a brake cable having a button on one end thereof, said cable being adapted to be tensioned to actuate the drum brake mechanism, said brake cable being blind-assembled to said lever by being inserted through the backing plate opening into and through said coil spring and moved axially into said channel, said spring ramp section and said channel sides guiding and deflecting said button and a portion of said cable adjacent thereto laterally upward and axially through said channel, side loading said cable and storing a spring-like force therein, until said button as moved beyond said ramp section and the edges of said channel sides forming said channel smaller open end, the spring-like force stored in said cable then moving said cable and said button laterally so that said cable is positioned in the bottom of said tapered channel and said button is in abutting engagement with the edges of said channel sides forming said channel smaller open end, tensioning of said cable for brake application then being transmitted to said lever through said button to actuate the drum brake.

2. In an assembled drum brake assembly having a drum to be braked, first and second brake shoe assemblies mounted on a backing plate, service brake actuating means selectively acting on said shoe assemblies to move same into braking engagement with said drum, and parking brake actuating mechanism for mechanically moving said shoe assemblies into braking engagement with said drum for parking brake purposes, said parking brake actuating mechanism including a spreader strut extending between said shoe assemblies, a parking brake lever pivoted at one lever end on one of said shoe assemblies and engaging said strut when pivoted in one direction to spread said shoe assemblies apart and move same into braking engagement with said drum, a compression coil spring urging said parking brake lever to the brake released position, and a parking brake cable extending through an apertured boss in said backing plate and connected to the other end of said lever for actuation thereof by the application of tension through the cable, the improvement comprising:

means for blind assembly and connection of said parking brake cable to said lever other end while said drum brake assembly is fully assembled so that there is substantially no manual or visual access to the parking brake lever other end, said last named means comprising:

said other end of said parking brake lever having an open "J" shape providing an upwardly open tapered channel;

said channel being defined by non-parallel sides joined by a rounded bottom with an inner wall forming the inner channel surfaces of said sides and said bottom, said channel further having an open receiving end facing said boss, an axially opposite open other end which is smaller than said open receiving end, and a notch formed in the edge of one of said sides adjacent said smaller open other end;

said compression coil spring having one end operatively secured to said boss and the other end including a last coil, a ramp section extending from said last coil, and a hook end, said last coil engaging said channel sides on the edges thereof adjacent said open receiving end in compressive force relation, said ramp section extending angularly upward through said channel with said hook end received in said notch and holding said spring ramp section and said spring last coil in place relative to said channel so that said ramp section provides a ramp from the bottom part of said channel at said open receiving end to a point at said smaller open other end adjacent to the top thereof and also at said notch;

a spring mounting and retaining guide having a center portion of said spring therein in mounting and guided relation;

said parking brake cable having a cable section of relatively small diameter and a button forming an enlarged cable end of substantially larger diameter than the diameter of said cable section, said enlarged cable end being on the end of said cable section connected with said lever other end:

said channel inner wall and said spring ramp section acting, when said cable and said button are moved axially further into said channel, to cam and guide said button and said cable upwardly in said channel laterally away from said channel bottom and axially toward said channel smaller open other end, and, in doing so, side loading said cable in a cantilever spring manner so that said cable is being urged back toward said channel bottom;

said button, upon passing beyond said spring ramp section and said channel smaller open other end, being moved by the side loaded force stored in said cable to locate said cable in said channel bottom, said button then engaging the edges of said channel sides at said smaller open other end and holding said cable in a locked and adjusted position relative to said parking brake lever and then being operative to exert actuating force on said parking brake lever when said parking brake cable is tensioned to actuate the parking brake.

3. In a blind cable assembly wherein a cable having a button on one end is to be secured to one end of a lever in an enclosed mechanism, the lever being arranged to actuate the enclosed mechanism in response to tension force applied thereto through the cable, the cable being inserted through an opening in a plate covering a part of the enclosed mechanism, the improvement comprising:

a compression coil lever return spring extending between the plate opening and the lever one end, said spring having an end coil with a ramp section extending therefrom terminating in a hook end;

a guide channel formed on the lever one end and receiving said end coil in abutting spring force transmitting relation, said ramp section being received in said channel and extending axially and laterally therethrough with said hook end being hooked onto said lever one end to hold said spring on said lever one end;

said spring ramp section being engaged by the cable button as the cable and button are inserted axially through said spring in guiding relation therewith, into said guide channel, said spring ramp section and said guide channel causing the cable button and the portion of said cable adjacent the button to become side loaded and to be deflected laterally outwardly of said channel until the button passes beyond the channel and said spring ramp section, the side load support then being removed so that the cable and the button are moved to a position with the cable in the channel and the button engaging a channel edge surface in tension force transmitting relation for mechanism actuation by tension force applied through the cable.

* * * * *